US006971093B1

(12) United States Patent
Spring

(10) Patent No.: US 6,971,093 B1
(45) Date of Patent: Nov. 29, 2005

(54) TECHNIQUES FOR MAINTAINING COMPATIBILITY OF A SOFTWARE CORE MODULE AND AN INTERACTING MODULE

(75) Inventor: Maximilian J. Spring, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 715 days.

(21) Appl. No.: 09/855,386

(22) Filed: May 14, 2001

(51) Int. Cl.$^7$ .............................................. G06F 9/44
(52) U.S. Cl. ..................................................... 717/170
(58) Field of Search ............................... 717/170, 122, 717/168–178; 370/238; 707/203

(56) References Cited

U.S. PATENT DOCUMENTS

| | | | | |
|---|---|---|---|---|
| 5,764,972 A | * | 6/1998 | Crouse et al. ................... | 707/1 |
| 6,188,659 B1 | * | 2/2001 | Mueller et al. ........... | 369/59.24 |
| 6,567,380 B1 | * | 5/2003 | Chen .......................... | 370/238 |
| 6,694,304 B1 | * | 2/2004 | Sethi ............................. | 707/2 |

OTHER PUBLICATIONS

Rekhter et al., "Network Networking Group, Request for comments(RFC): 1771", http://www.faqs.org/ftp/rfc/pdf/rcf1771.txt.pdf, Mar. 1995.*

Atkins et al. Using Version Control Data to Evaluate the Impact of Software Tools. ACM. 1999. pp. 324-333.*
Thomas. Version and Configuration Management on a Software Engineering Database. ACM. 1989. pp. 23-25.*
Tichy. Software Development Control Based on Module Interconnection. IEEE. 1979. pp. 29-41.*

* cited by examiner

Primary Examiner—Wei Y. Zhen
(74) Attorney, Agent, or Firm—Hickman Palermo Truong & Becker, LLP

(57) ABSTRACT

Techniques for maintaining version compatibility between a first module and one or more interacting modules that interact with the first module through an interface. Stored mapping maps instances of a data structure describing the interface at corresponding release times with corresponding version numbers for the first module. A second version number is automatically developed for a second module of the interacting modules based on the mapping. Compatibility is determined based on a first version number for the first module and the second version number for the second module. These techniques allow the developer of the central module to provide the developers of the interacting modules with a tool to automatically assign version numbers to the interacting module being developed. Automatic assignment of version numbers avoids the tedium and errors associated with manual methods. Furthermore, the automated methods not only ensure compatibility but also discover compatibility with the earliest core module.

27 Claims, 12 Drawing Sheets

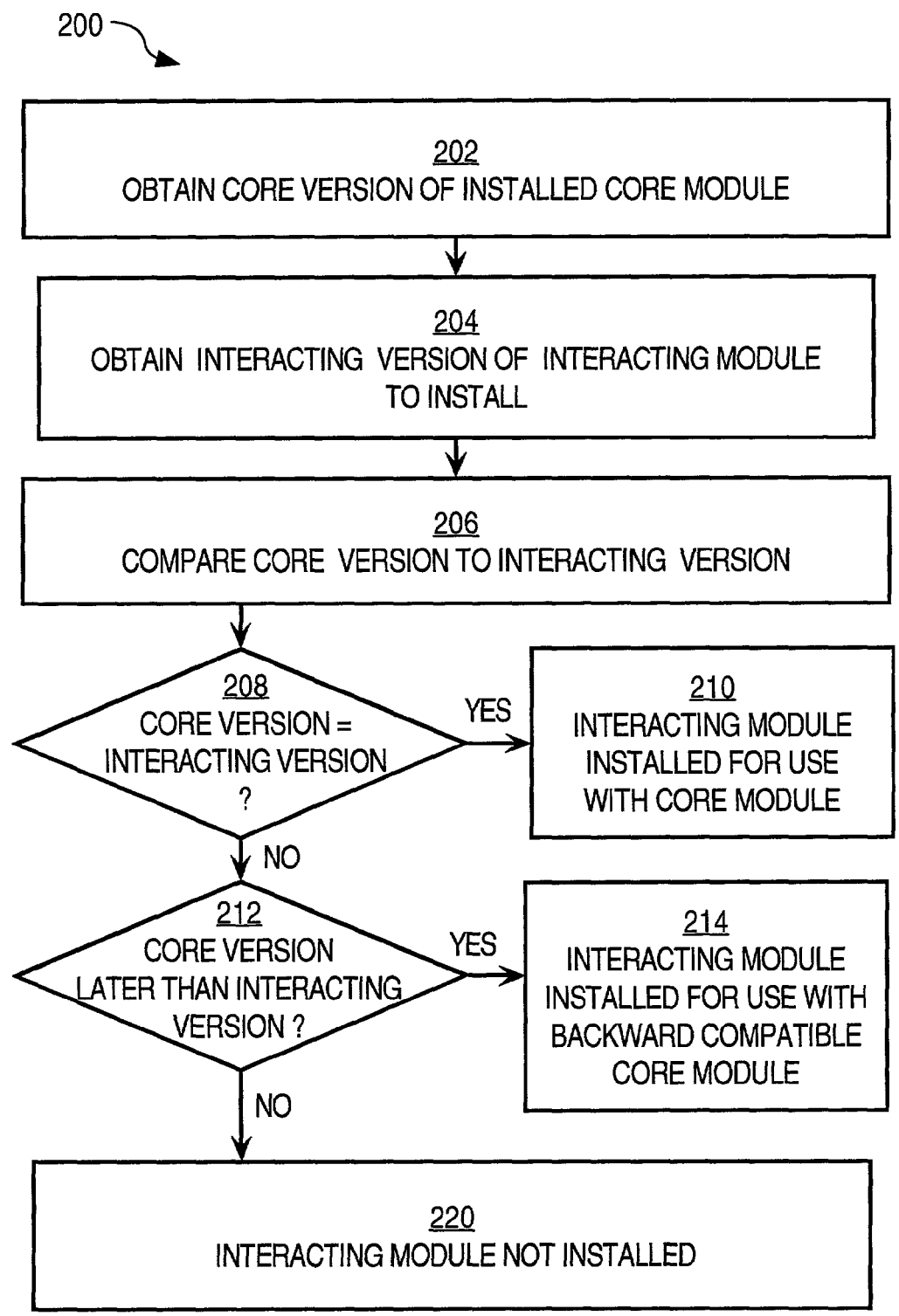

- 442 IDENTIFICATION FOR CORE MODULE
- 444 NUMBER OF IMPLEMENTED ROUTINES

460a HASHED VALUE BASED ON:
- NAME OF FIRST ROUTINE
- RETURN TYPE OF FIRST ROUTINE
- NUMBER OF PARAMETERS
  - NAME OF FIRST PARAMETER
  - TYPE OF FIRST PARAMETER
  - NAME OF SECOND PARAMETER
  - TYPE OF SECOND PARAMETER
  - ••• 461

460b

••• 465

446 NUMBER OF ABSTRACT ROUTINES

460c

460d

••• 467

TECHNIQUES FOR MAINTAINING COMPATIBILITY OF A SOFTWARE CORE MODULE AND AN INTERACTING MODULE

FIELD OF INVENTION

The present invention generally relates to software development in a distributed environment. The invention relates more specifically to maintaining compatibility between a software core module that is developed by one group and one or more separately developed domain specific interacting modules that interface with the core module.

BACKGROUND OF THE INVENTION

In many circumstances, complementary hardware or software modules developed by different groups of individuals are required to interact with each other. To ensure that the interaction is successful, one or more of the groups define one or more interfaces where the interacting modules connect. One circumstance that benefits from implementing interacting modules is where a core software module interacts with a variety of domain specific interacting modules. The core module provides generic capabilities shared by all the domains, and the interacting modules provide domain specific details.

For example, a core module of a network management system may provide generic capabilities for managing a network, such as displaying the connections between devices, displaying the status of each device and enumerating the message traffic handled through each device. The network management system module interacts with device description modules that each describes the properties and actions performed by a particular device on the network, such as a particular router, hub, or bridge device. The software interface can be implemented in any of several ways known in the art, including sending messages to concurrently running processes or invoking routines in a library of routines, such as a library of routines loaded and linked dynamically at runtime, or some combination of these ways.

This arrangement of core and interacting modules provides greater flexibility than treating all applications in one module. Many changes in a domain or the development of new domains are accommodated by adding to the number of domain specific modules that can be interfaced to the core module. The core module need not be changed.

Another benefit of this arrangement is that the size or complexity of a single module, or both, is reduced. If the modules apply to one domain one at a time, a large number of domains can be accommodated in series by operating the core module with one applicable domain-specific module at one time. At any one time, the domain-specific properties of the non-applicable domain-specific modules are not included in the operational modules.

Another benefit of this arrangement is that more applications can be generated than could be generated with the resources of the developer of the core module alone. By publishing the interface, the domain specific modules can be developed by many different entities using their resources. This increases the number of applications using the core module.

However, problems begin to arise when the interface between the core module and the domain-specific interacting modules changes. FIG. 1A is a block diagram that illustrates this problem. Core module 102 represents an initial version of a core module with which one of several domain-specific interacting modules 112 may interact. The interface is represented by features 104, 106 of core module 102. The complementary interface is represented by features 114, 116 of interacting module 112a. Arrow 118 indicates that the interacting modules 112 are compatible with the core module 102, i.e., the interacting modules 112 have interfaces with complementary features that couple with the features of the interface of the core module 102.

When the core module changes its interface, for example, to provide improved functionality, a later version core module results. Later core module 132 has an interface having an additional feature 136. Interacting modules 142 designed for the new interface may include in the interface the additional complementary feature 146. Arrow 148 indicates that the interacting modules 142 are compatible with the later version core module 132. However, the interacting modules 142 designed for the later version core module 132 are now incompatible with the early version core module 102. The early version core module 102 does not have feature 136 and cannot interface with the complementary feature 146 on the interacting modules 142.

If the later version core module 132 is not designed to be backward compatible, the problem is even greater. The illustrated later version core module is backward compatible as shown. The later version core module has features 104, 106 that interface with all the features 114, 116, respectively, on the domain-specific modules 112 designed for the early version. Arrow 120 indicates that the interacting modules 112 are compatible with the later version core module 132. In some cases, the later version might not be backward compatible. For example, referring to FIG. 1B, a newest core module 162 that eliminates feature 106 would not be compatible with the earlier interacting modules 112, 142 that employ the complimentary feature 116.

With changing interfaces on the core module, not every interacting module is compatible with every core module, and users of the modules have to determine compatibility before using the modules together. One past approach for determining compatibility is to assign version numbers to the core module such that the version number increases in value with each successive version of the core module in time. For example, with reference to FIG. 1A, the early version core module 102 is given version number "2" and the later version core module is assigned version number "32." When an interacting module is developed, it is assigned a version number equal to the version number of the core module at the time the interacting module is developed.

For example, domain specific interacting module 112a, designed after core module 102 and before core module 132, is assigned version number "2." Similarly, domain specific interacting module 142a, designed after core module 132 and before any other core module, is assigned version number "32." Then, before the modules are used together, compatibility is determined by comparing version numbers.

If the version number of the core module is less than the version number of the interacting module, the modules are incompatible and are not used together. For example, if the version number of the core module is "2" (such as for module 102) and the version number of the interacting module is "32" (such as for module 142a) the modules are incompatible and are not used together.

If the core modules are backward compatible, as shown in FIG. 1A, then the core module may have a version number greater than the version number of the interacting module and the modules would still be compatible. If the core modules are not backward compatible, then the versions numbers must be equal for the two modules to be compatible.

However, this past approach has numerous disadvantages. The past approach is manual, and therefore subject to human error. A developer of the interacting module may err in determining the current version number of the core module or in assigning the version to the interacting module. This problem becomes worse where the technology is relatively new, or commercial activity is involved in which rapid advances are important to maintaining market leadership. In these circumstances new versions of the core module are released frequently or before interfaces can be standardized by a comment and review process.

Furthermore the past approach often does not reflect the true compatibility between the interacting modules and the core module. For example, if interacting module 112b is developed after the later version core module 132 is released, then the past approach assigns a value of "32" to the version for the interacting module. However, according to the past approach, this version number indicates the interacting module 112b is not compatible with core module 102 having a version number of "2." Yet interacting module 112b does not use the new feature 136 of the interface of the later version core module 132, and really is compatible with the early version core module 102. Thus assigning version numbers simply by the latest version of the core module when an interacting module is developed does not accurately reflect all the compatibilities.

An alternative approach is to set the version number of the interacting module to the earliest core module with which it is compatible. However, determining the earliest version using the past manual approach involves testing the module with several earlier versions until one is found that is not compatible, or involves examining all the features of the interface. This is a tedious process and subject to more human errors. The manual techniques are especially tedious and subject to error in software applications, where the interface can comprise dozens of routines and corresponding parameters of varying complex types.

Based on the foregoing, there is a clear need for techniques to automatically assign version numbers to interacting modules that correctly identify compatibilities with the earliest versions of a core module.

SUMMARY OF THE INVENTION

The foregoing needs, and other needs and objects that will become apparent from the following description, are achieved in the present invention, which comprises, in one aspect, techniques for maintaining version compatibility between a first module and one or more interacting modules that interact with the first module through an interface. The techniques include describing the interface at several release times with corresponding instances of a data structure. A mapping is formed that associates the plurality of instances with corresponding version numbers for the first module. The instances of the data structure and the mapping are provided with a tool to a developer of an interacting module. The tool automatically develops a second version number for a second module of the interacting modules. Compatibility is determined based on a first version number for the first module and the second version number for the second module.

In another aspect of the invention, techniques for maintaining version compatibility between a first module and one or more interacting modules that interact with the first module through an interface include retrieving data from a stored mapping. The stored mapping maps instances of a data structure describing the interface at corresponding release times with corresponding version numbers for the first module. A second version number is automatically developed for a second module of the interacting modules based on the mapping. Compatibility is determined based on a first version number for the first module and the second version number for the second module.

According to an embodiment of this aspect, developing the second version number further includes describing a subset of the interface, where the subset is employed by the second module. Of the plurality of instances, at least one instance is determined which includes data describing the subset of the interface. The second version number for the second module is assigned based on the mapping and the at least one instance.

According to another embodiment of this aspect, the second version number is developed when the second module is developed; and compatibility is determined at a later time.

Another aspect comprises techniques for determining version compatibility between a first module and a second module of one or more interacting modules that interact with the first module through an interface. These techniques include obtaining a first version number for the first module and obtaining a second version number for the second module. The second version number is set when the second module is developed based on a mapping between instances of a data structure describing the interface at corresponding release times and corresponding version numbers for the first module. It is then determined whether the modules are compatible based on the first version number and the second version number.

The techniques of various aspects of the invention encompass a method, a computer readable medium, a system and a computer system.

These techniques allow the developer of the central module to provide the developers of the interacting modules with a tool to automatically assign version numbers to the interacting module being developed. The automatic assignment of version numbers avoids the tedium and errors associated with manual methods. Furthermore, the automated methods not only ensure compatibility but in some embodiments also discover compatibility with the earliest core module, even if it the compatible core module substantially predates the time when the interacting module is developed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a flowchart that illustrates one embodiment of a method for determining compatibility between modules based on version numbers;

FIG. 4C is a block diagram that illustrates another embodiment of a data structure describing the interface of a core software module;

DETAILED DESCRIPTION OF THE PREFERRED EMBODIMENT

Figure 1A:
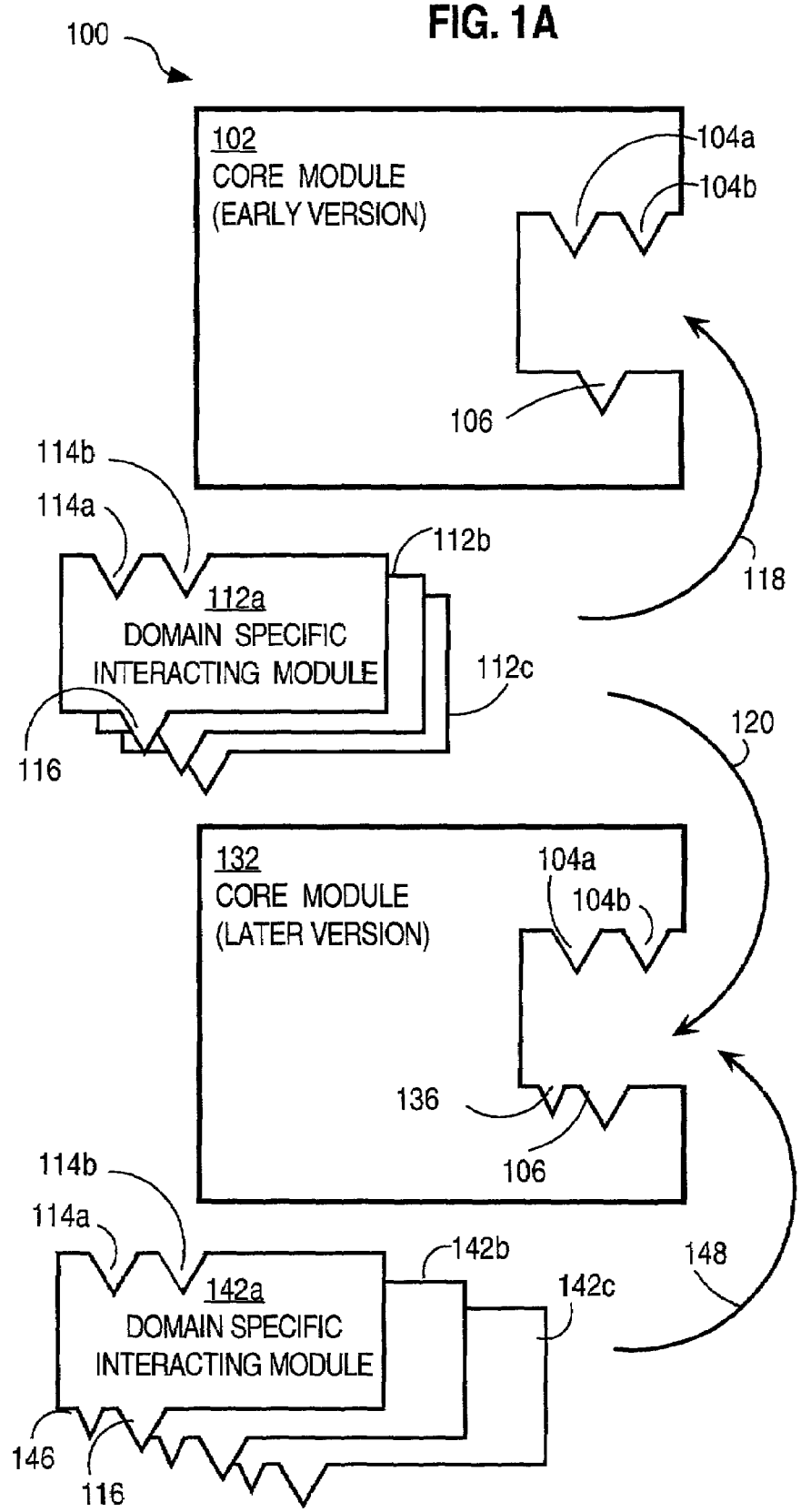
FIG. 1A is a block diagram that illustrates backward compatibility between versions of a core module and one or more interacting modules.

A method and apparatus for maintaining compatibility between a core module and interacting modules is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

An embodiment of the invention is described in the context of a core software module for performing generic network device management interacting with any of several device description interacting software modules. A software module comprises instructions for causing one or more processors to perform one or more tasks. The instructions may be expressed in a native instruction set for the processor or expressed in a higher-level language that is compiled or interpreted to the native instruction set. In this embodiment, the interface comprises one or more constants, variables, and callable routines that are loaded into memory from a library of routines and executed when invoked by a calling routine at runtime. Although this context is used to facilitate describing an example embodiment, the invention is not limited to this context.

In the context of network device management modules, the interacting modules include instructions to obtain a property of a corresponding networking device type of multiple networking device types.

Networking device types include, for example, one or more models of a hub, a repeater, a bridge, a switch, a router, and a gateway. A hub provides a central connection point for cables. A repeater boots the power of a signal on a network without changing the information so that the signal can be passed over longer distances. A bridge segments networks so that signal traffic can bypass some network devices. A switch also segments networks but does so using more hardware components than a bridge, to provide greater speed. A router connects a first network with a second network. A gateway provides a means to connect computer systems using different network protocols. The properties of a device include manufacturer name, device name, model number, serial number, and number of ports.

The interacting module also includes instructions to obtain an action performed by the corresponding networking device type, such as reporting status of device, reporting activity and status on the ports of the device, reporting a number and types of subcomponents, and configuring the device.

In the context of network device management modules, the core module includes instructions causing one or more processors, based on interacting with a particular interacting computer program module, to communicating with a first device of the corresponding networking device type on a network of networking devices including the first device. The core module also includes instructions for presenting properties of the first device to a network manager for the network, and displaying connections among the networking devices of the network to the network manager.

The core module interface includes routines that may be invoked by the domain specific module with which it is coupled and also invokes routines included in the domain specific module. This distinction between routines invoked by the core module and routines invoked by the domain-specific module is illustrated in FIG. 1A. In FIG. 1A, on the interface of a core module, such as block 102, a routine of the domain-specific module invoked by the core module is represented by convex features 104 that extend outward from the core module. In FIG. 1A, a routine of the core module invoked by the domain specific module is represented by concave features 106, 136 that extend into the core module.

Similarly, on the interface of a domain-specific module, such as block 142a, a routine of the core module invoked by the domain-specific module is represented by convex features 116, 146 that extend outward from the domain-specific module. In FIG. 1A, a routine of the domain-specific module invoked by the core module is represented by concave features 114 that extend into the domain-specific module.

In one embodiment of the network management system, the modules are class files comprising one or more classes expressed in the Java™ programming language (hereinafter referred to as Java) developed by Sun Microsystems, Inc. A routine implemented in a first module is a method of one of the Java classes for the first module. A method includes a name and list of parameters and their types and instructions. Types of routines and parameters are described in more detail in a later section. A routine implemented in another module is an abstract method of the Java classes for the first module. An abstract method has a name and list of parameters and their types, but does not include executable instructions. A Java class comprising only abstract methods is called an interface in Java parlance because it is used by one module to invoke methods in a different module.

In effect, the interface of the network management system comprises two Java interfaces, one Java interface for methods invoked by the core module and implemented in the domain-specific module, and a second Java interface for methods invoked by the domain-specific module and implemented in the core module. As used herein, a software interface includes names and types of either implemented methods or abstract methods or both. When a Java interface is intended it will be explicitly stated as a Java interface.

Version Checking

FIG. 2A is a flowchart that illustrates one embodiment of a method 200 for determining compatibility between modules based on version numbers.

In this embodiment, compatibility is determined after the core module has been installed on a user's system and when a particular interacting module is submitted for installation. In some embodiments a tool for installing modules that is provided by the developer of the core module determines compatibility. For example, in the network management system a device support utility determines the compatibility of the core module and interacting module before installing the interacting module. In other embodiments, the method 200 is applied at other stages after installation of the core module and before execution of the interacting module, such as before invoking the interacting module from the core module at runtime. In step 202, the version of the installed core module, called herein the core version number, is obtained. In this embodiment, the core module includes data indicating the core version number. In step 204, the version of the interacting module to be installed, called the interacting version number herein, is obtained. In this embodiment, the interacting module includes data indicating the interacting version number. In step 206 the core version number and the interacting version number are compared.

Step 208 represents a branching point based upon whether the core version number equals the interacting version number. If the version numbers are equal, the modules are always compatible and control passes to step 210 in which the interacting module is installed. If the version numbers are not equal, control passes to step 212.

Step 212 represents a branching point based upon whether the core version number is later than the interacting version number for backward compatible core modules. If the version numbers increase with time, then the later version numbers are greater than the earlier version numbers. However, compatibility can also be determined if the version numbers decrease with time, in which case the later version numbers are less than the earlier version numbers. The version numbers effectively indicate compatibility as long as the version numbers change with time in one direction, either increasing or decreasing, but not both.

If the core version number is later than the interacting version number, then the modules are compatible for backward compatible core modules, and control passes to step 214 in which the interacting module is installed for a backward compatible core module.

If the core version number is earlier than the interacting version number, or the core module is not backward compatible, then the modules are not compatible, and control passes to step 220. In step 220, the module is not installed, and any messages or warnings to the user are issued. In one embodiment, the user is directed to a source for a compatible core module.

Figure 1B:
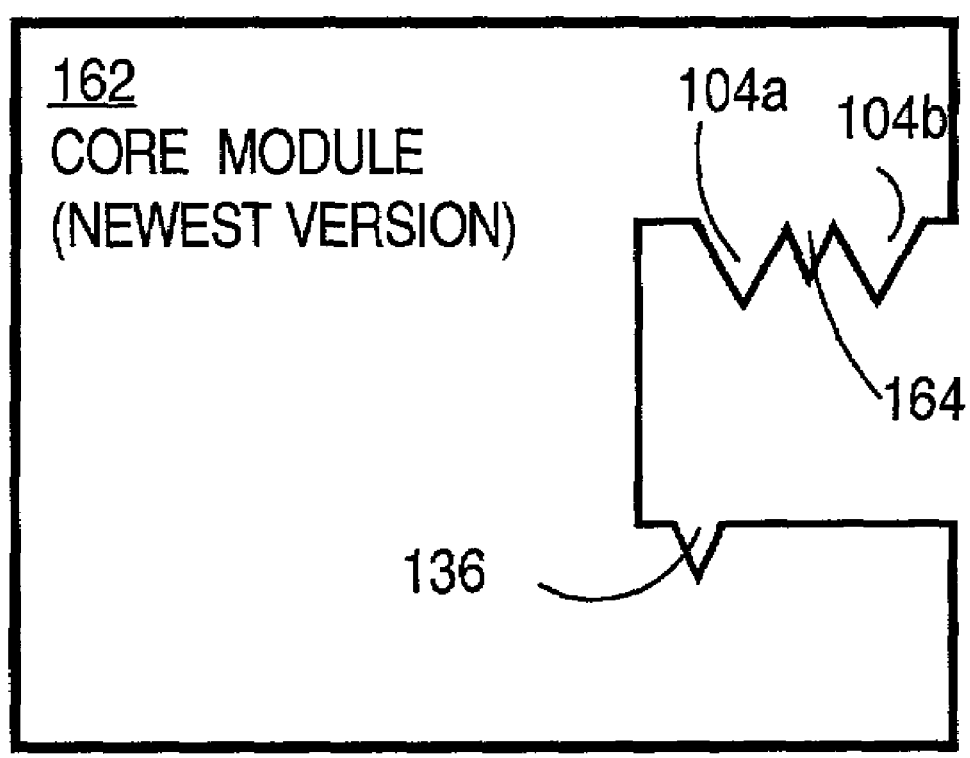
FIG. 1B is a block diagram that illustrates a backward incompatible version of a core module.

In another embodiment, both backward compatible and non-backward compatible changes to a core module are allowed. For example, a newest version of the core module (e.g., 162 in FIG. 1B) for a network management system is not backward compatible with the domain specific device description modules (e.g., 112 and 142 in FIG. 1A) if the new core module no longer includes a routine (e.g., 106) invoked by the pre-existing device description modules, or if it invokes a routine (e.g., 164 in FIG. 1B) not implemented in the pre-existing device description modules (such as with a third concave feature missing from modules 112 and 142 in FIG. 1A). In this example, core module 132 is backward compatible with interacting modules generated for core module 102, but the newest core module 162 is not compatible with the interacting modules generated for core modules 102, 132.

In this embodiment, two version numbers are used together. A major version number is changed when a change is made to the core module that is not backward compatible. A minor version number is changed when a change is made to the core module that is backward compatible with versions having the same major version number. A composite version number is constructed by combining the major and minor version numbers with a separator, such as a decimal point or hyphen.

For example, the two backward compatible versions of the core module shown in FIG. 1A share a major version number, say major version number "1," and have different minor version numbers. Their composite version numbers are then 1.2 and 1.32, for example. The newest core module 162 that is not backward compatible has a later major version number, say "2," and starts over with the minor version numbers, say "1." The composite version number of the newest core module would be 2.1.

Figure 2B:
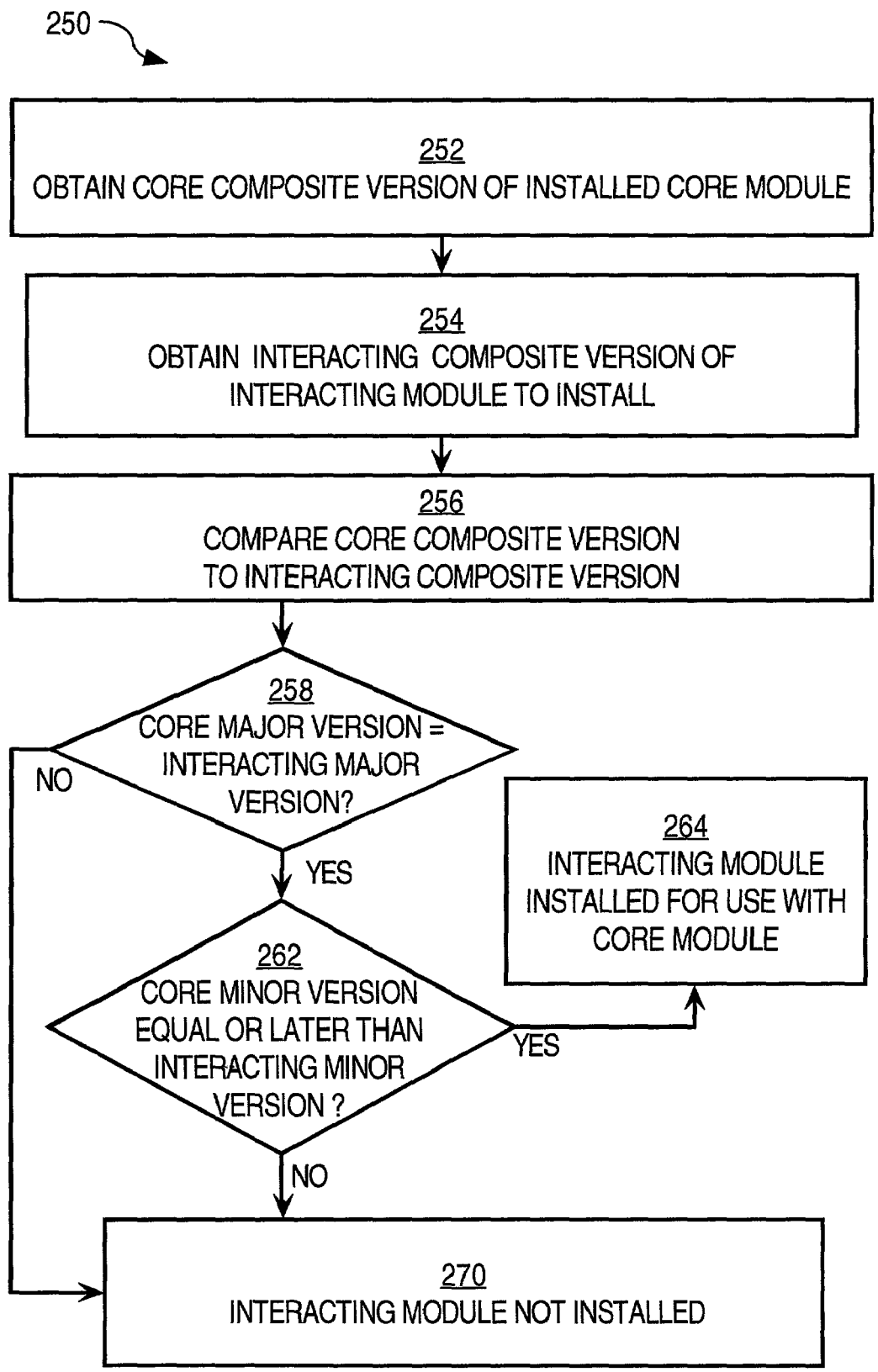
FIG. 2B is a flowchart that illustrates another embodiment of a method for determining compatibility between modules based on version numbers.

FIG. 2B is a flowchart that illustrates embodiment 250 of a method for determining compatibility between modules based on composite version numbers. For example, in the network management system the device support utility determines the compatibility of the core module and interacting module using composite version numbers, called "engine-package interface" (epi) version numbers, before installing the interacting device description module.

In step 252, the composite version number of the installed core module, called herein the core composite version number, is obtained. In this embodiment, the core module includes data indicating the core composite version number. In step 254, the composite version number of the interacting module to be installed, called herein the interacting composite version number, is obtained. In this embodiment, the interacting module includes data indicating the interacting composite version number. In step 256 the core composite version number and the interacting composite version number are compared.

Step 258 represents a branching point based upon whether the major version number of the core composite version number equals the major version number of the interacting composite version number. If the major version numbers are equal, then the modules are compatible if the minor version numbers indicate compatibility; and control passes to step 262 to determine compatibility. If the major version numbers are not equal, the modules are never compatible and control passes to step 270, in which the module is rejected, i.e. is not installed. As in step 220, in step 270, any messages or warnings to the user are issued. In one embodiment, the user is directed to a source for a compatible core module.

Step 262 represents a branching point based upon whether the minor version number of the core composite version number is later than or equals the minor version number of the interacting composite version number. If so, then the modules are compatible; and control passes to step 264. In step 264, the interacting module is installed for operation with the installed core module.

The invention automatically provides version numbers, such as composite version numbers, for interacting modules to be used in checking compatibility between the interacting modules and a core module already installed in a user's system.

Method of Developing Core Modules

Figure 3A:
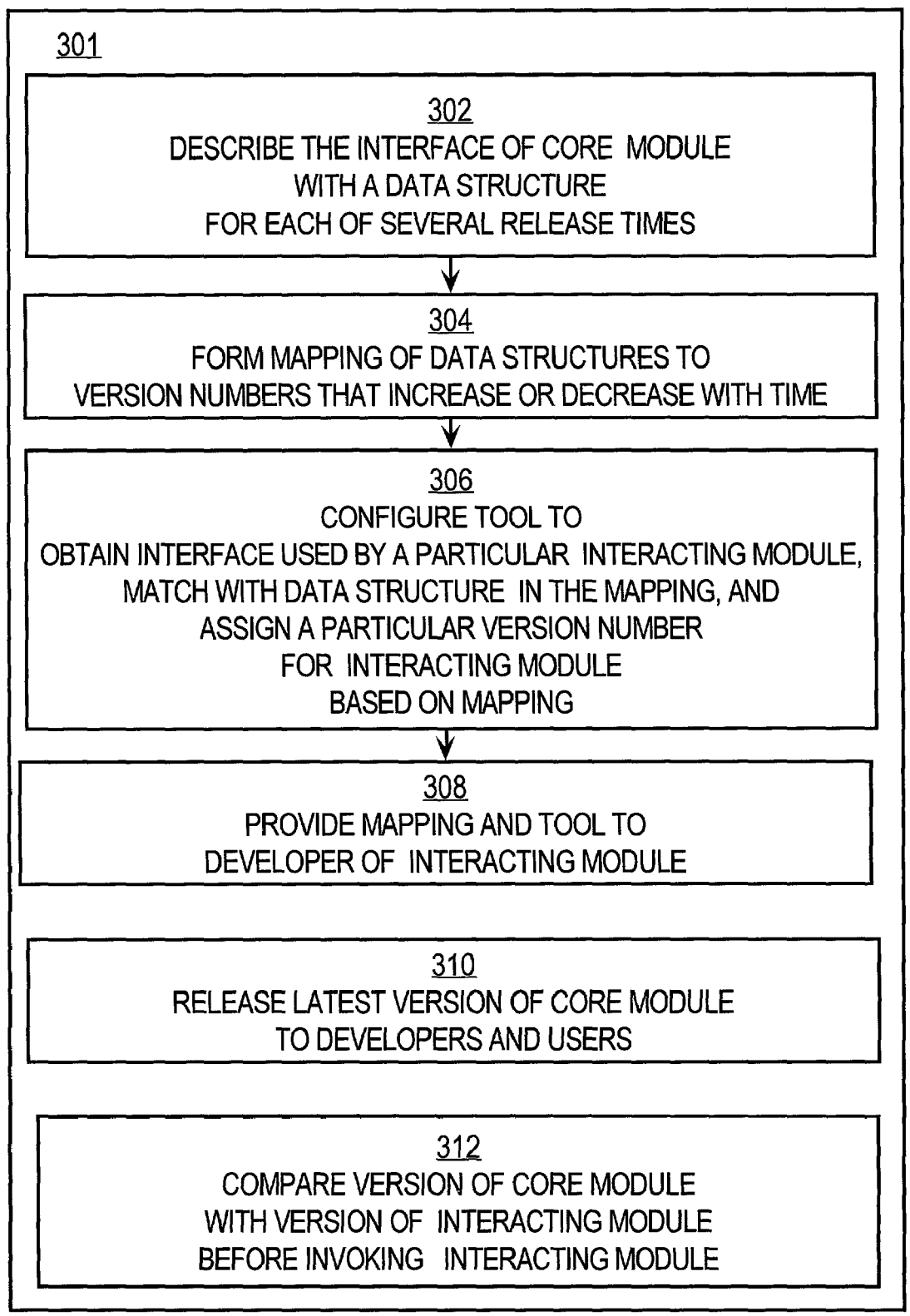
FIG. 3A is a flowchart that illustrates a high level overview of one embodiment of a method for releasing a new version of a core module.

FIG. 3A is a flowchart that illustrates a high level overview of one embodiment 301 of a method for developing and releasing new versions of a core module for users and developers of interacting modules. In step 302, the core module interface is described with data stored in a data structure. A data structure is generated and stored for each core module released at one or more release times. The description of the interface and the data structure are described later herein.

In step 304, a mapping is formed between the data structures and version numbers associated with the releases. The version numbers change in one direction with time of the one or more release times. For example, the version numbers increase with time of release or decrease with time of release, but not both. If a prior mapping has been stored, then it is retrieved and the newer version numbers and corresponding data structures are added.

In one embodiment new composite version numbers are assigned manually. Starting from the first release not already in the mapping, a composite version number is assigned to the data structure describing each new release. If the next core module is not backward compatible with interacting modules designed for the preceding core module, then the major version number is changed and the minor version number is reset. For example, the major version number is incremented by one, and the minor version number is reset to zero.

If the next core module is backward compatible with interacting modules designed for the preceding core module, then the major version number remains unchanged and the minor version number may be changed. For example, the minor version number is incremented by one. In some embodiments, the minor version is not changed if the interface is the same in the new core module, such as occurs when methods are improved internally, or faults are removed. These changes do not affect the compatibility with interacting modules and do not engender a version number change. In one embodiment, the mapping is stored after adding the newer releases.

In one embodiment, the minor version number is changed automatically. This embodiment uses a current data structure describing the interface for the newest version of the core module and compares the current data structure to the previous data structure describing the interface for the previous version of the core module. If the contents of both data structures are the same, the minor version number is not changed. If the contents of the two data structures differ, the minor version number is incremented by one.

In one embodiment, the mapping is formed automatically once the composite version number is assigned as described in greater detail in a later section.

In step 306, a tool is configured to use the mapping to automatically assign to an interacting module the earliest version number that accurately expresses compatibility with the core module. This tool is described later herein.

In step 308, the tool and mapping are provided to developers of interacting modules, for use as described with respect to FIG. 3B below.

In step 310 the latest version of the core modules is released to users and to developers of the interacting modules.

Step 312 represents use of a tool to determine compatibility of a particular interacting module with a particular released version of the core module. This tool is based on either method 200 or method 250 described above with respect to FIG. 2A and FIG. 2B, respectively. For example, this tool is included in the device support utility of the network management system. This tool may be used by the core module developer to help manually assign the new version numbers or simply for operating any of the core modules. A similar tool is employed by users of the core module when installing a new interacting module.

A benefit of this method is that the developer of the central module provides the developers of the interacting modules with a tool to automatically assign version numbers to the developed interacting module. The automatic assignment of version numbers avoids the tedium and errors associated with manual methods. Furthermore, as described below, the automated methods not only ensure compatibility but also discover compatibility with the earliest core module, even if the compatible core module substantially predates the time when the interacting module is developed.

Method of Developing an Interacting Module

Figure 3B:
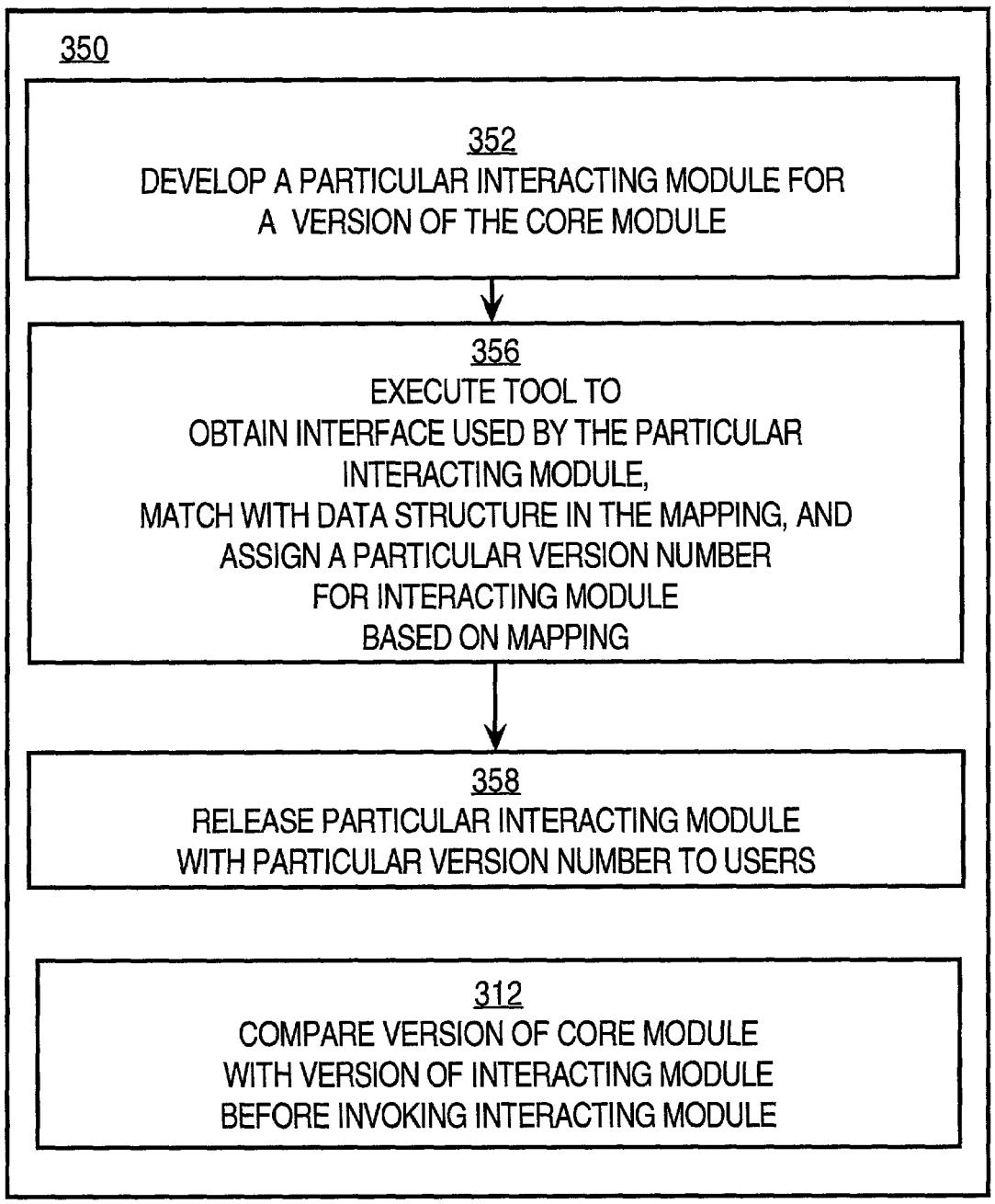
FIG. 3B is a flowchart that illustrates a high level overview of one embodiment of a method for automatically assigning a version number for a newly developed interacting module.

FIG. 3B is a flowchart that illustrates a high level overview of one embodiment 350 of a method for automatically assigning a version number during development of a new interacting module.

In step 352, a particular interacting module is developed for the last released core module received by the interacting module developer. In step 356, the tool supplied with the last released core module is executed to automatically determine the version number for the new interacting module based on the mapping between the data structures and the descriptions of the interface. The tool is described in more detail in a later section with respect to FIG. 5.

In step 358 the particular interacting module is released to users. The particular interacting module includes the automatically determined version number.

Step 312, described above, represents a tool to determine compatibility of a particular interacting module with a particular released version of the core module. This tool is used by the developer of an interacting module to check the compatibility of the newly developed interacting module with one or more released versions of the core module.

A Mapping of Version Numbers to Interface Descriptions

Figure 4A:
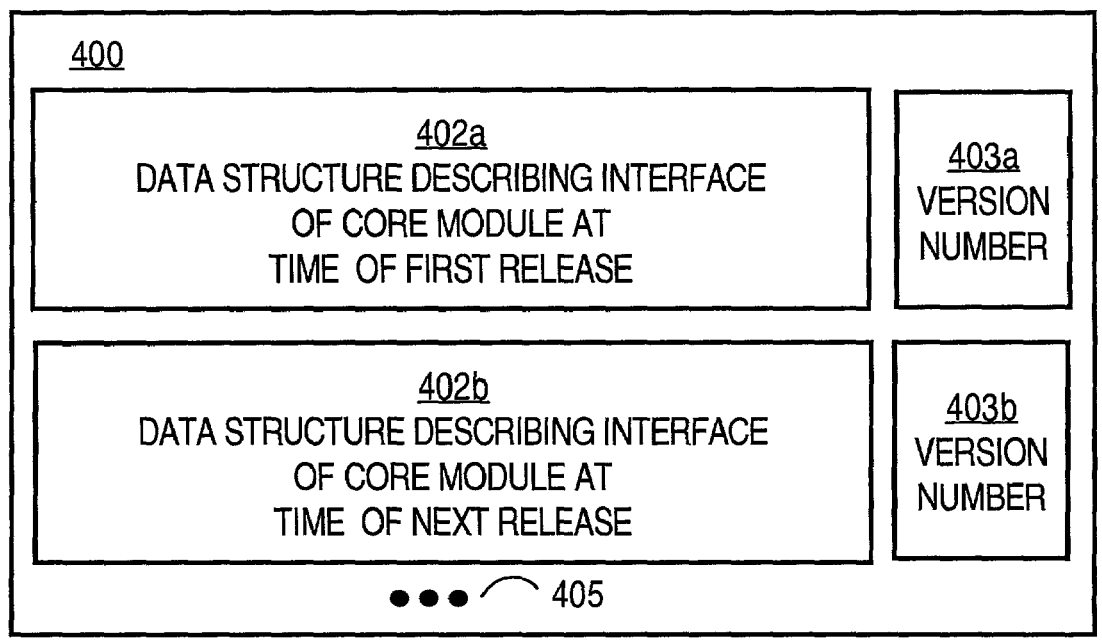
FIG. 4A is a block diagram that illustrates one embodiment of a mapping between version numbers of a core module and descriptions of the module's interface.

FIG. 4A is a block diagram that illustrates an embodiment of a mapping 400 between version numbers 403a, 403b of a core module at various release times and data structures 402a, 402b containing descriptions of the core module's interface at the time of release. The data structures are described in more detail with respect to FIG. 4B and FIG. 4C.

Data structure 402a describes the interface of the core module at a first release time and version number 403a represents the corresponding version number at that first release time. Data structure 402b describes the interface of the core module at a next release time and version number 403b represents the corresponding version number at that next release time. Ellipses 405 indicate that the mapping 400 may include other data structures and corresponding version numbers for other releases at other times.

According to one embodiment, the mapping 400 is formed during step 304 of FIG. 3A by generating and storing a set of pairs represented by the expression "(D,E)," where "D" represents one of the data structures, e.g., data structure 402a, describing the interface for one release, and E is the smallest value of the minor version number, e.g. 403a, that includes all the features described in D. The minor version numbers increase with time of release in this embodiment. In this embodiment, the major version number is the same as the latest release of the core module, represented by "$M_L$." At the beginning of the methods of this embodiment, the various releases of the core modules for the current major version number $M_L$ are available with their minor version numbers, but the data structures and their mapping to the version numbers are not yet formed. In this embodiment, steps 304, 302 are performed iteratively with each available release of the core module.

In this embodiment, the mapping is empty at the start. One of the available releases of the core module is read to obtain the minor version number E and the declaration of constants, variable and routines of the interface. The data structure D is derived from these declarations. The data structure D is compared to entries already in the mapping. If D is not already in the mapping, as occurs for the first core module read, among others, then D is added to the mapping in association with minor version number E. If D is already in the mapping, the value X of the minor version number associated with D in the mapping is retrieved and X is compared to E. If E is smaller (earlier) than X, E replaces X in the mapping. Otherwise, the mapping is left as it is. The method repeats by reading the next available core module until no available core modules are left unread. When the last available core module is read, the mapping is stored.

Figure 4B:
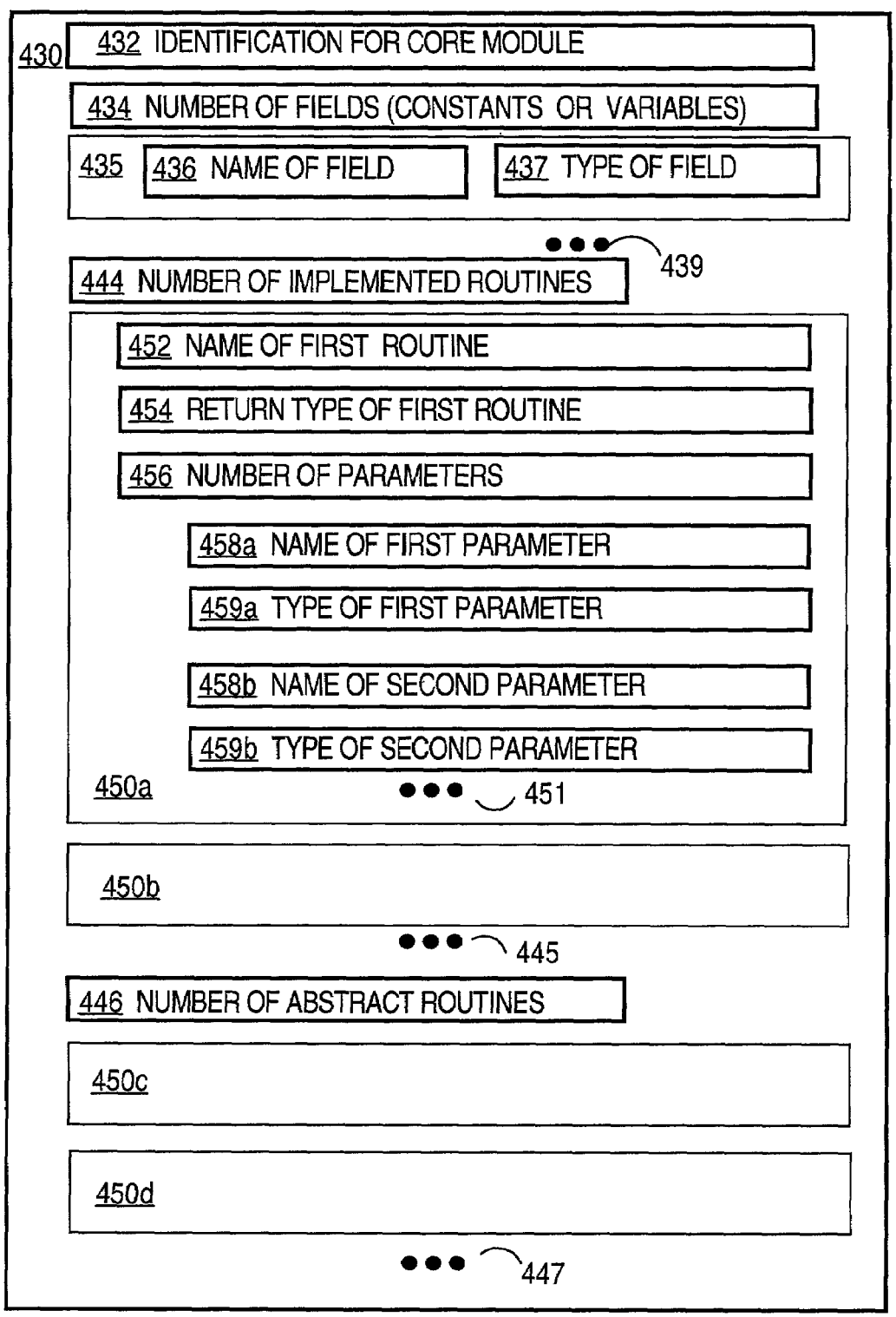
FIG. 4B is a block diagram that illustrates one embodiment of a data structure describing the interface of a core software module.

FIG. 4B is a block diagram that illustrates an embodiment of a data structure 430 describing the interface of a core software module. As used here, a routine is a separately callable method in a software module and a field is a constant or variable that may be obtained from the module. The fields that are passed to or from a routine are called parameters.

Data structure 430 is hierarchical, such that each field and routine can be retrieved separately. In other embodiments simple flat data structures holding a series of numbers or characters can be used to store the fields, routines and their types.

In this context, type refers to an abstract data type. Primitive abstract types are defined in most computer programming languages and may include one or more integer types of different numbers of bits, floating point number types for representing decimals of any size with a precision that depends on the number of bits, a character type that uses bits as a code for letters, numerals and symbols, a Boolean type to represent one of only two conditions, true and false, etc. An array type is a series of fields of a given type, and a string type represents an array of character type fields. More complex types can be defined in most languages by combining other types and giving the combination a unique name. For example, a type "network_device" can be defined that combines a string type variable named "device_name," an integer type variable named "number_of_ports," and a Boolean type variable named "status." In some languages, such as Java, a routine is given a type based on a return variable; if no variable is returned, the routine type is "void' or its equivalent. A routine that returns a variable of "network_device" type has a routine type of "network_device." In an object oriented programming language, such as Java, objects are data structures that are produced from classes that are defined and named; so the type of an object is the name of the class to which the object belongs.

Data structure 430 includes a string 432 identifying the core module. For example, the string 432 contains "Company A Network Management System 500." Data structure 430 then includes integer 434 indicating the number of fields (constants or variables) used in the core module that can be referenced by the interacting module outside of any routine. If there are more than zero fields, then a substructure 435 is included for each field. Substructure 435 includes a string 436 giving the name of the field and a string 437 giving the type of the field. If there is more than one field, substructure 435 is repeated as indicated by the ellipses 439 to describe all the fields.

Data structure 430 includes an integer 444 indicating the number of implemented routines in the core module. These implemented routines are the routines implemented in the core module that may be invoked by the interacting module, as illustrated by features 106 and 136 in FIG. 1A. If there are more than zero implemented routines, then a substructure 450 is included for each routine. If there are more than one implemented routine, substructure 450 is repeated to describe all the implemented routines, as illustrated in FIG. 4B by substructure 450*b* and the ellipses 445.

Substructure 450 (e.g., 450*a*, 450*b*, 450*c*, 450*d*) describes a routine by its name, its type, and the name and types of any parameters passed between the implemented routine and the calling module. As shown for substructure 450*a* for the first implemented routine in the illustrated example, the substructure 450 includes a string 452 giving the name of the routine and a string 454 giving the type of the routine. The substructure 450 further includes an integer 456 indicating the number of parameters passed through the routine. If more than zero parameters for the routine exist, then a pair of strings is included for each parameter, including a string 458 giving the name of the parameter and string 459 giving the type for the parameter. If more than one parameter exists, the pair of strings is repeated to describe all the parameters, as illustrated in FIG. 4B by strings 458*b* and 459*b* and the ellipses 451. In other embodiments, substructure 450 does not include all this information. For example, in one embodiment, the parameter type 459*a*, 459*b* is included, but not the parameter name 458*a*, 458*b*.

The values stored in substructure 450 constitute a signature value for the routine or method. The signature value uniquely identifies a routine.

Data structure 430 includes an integer 446 indicating the number of abstract routines in the core module. These abstract routines are the routines implemented in the interacting module that may be invoked by the core module, as illustrated by features 104 in FIGS. 1A and 164 in FIG. 1B. The names and types are specified in the core module so that the routine in the interacting module can be invoked properly by the core module; but the instructions that cause a processor to perform a particular task associated with the routine are not included in the core module. When the modules are Java packages, the abstract routines of the core module interface constitute one or more Java interfaces.

If there are more than zero abstract routines, then a substructure 450 is included for each routine, as illustrated in FIG. 4B by 450*c*. If there are more than one abstract routine, substructure 450 is repeated to describe all the abstract routines, as illustrated in FIG. 4B by substructure 450*d* and the ellipses 447.

In one embodiment employing compound version numbers, the data structure does not include the number or signature of abstract routines. In this embodiment, the method is used only to assign the minor version numbers within a set of releases having the same major version number. Since adding an abstract routine that the core module invokes in the interacting module destroys backward compatibility, it requires a change in the major version number.

In this embodiment, the major version numbers are assigned manually so there is no need for the data structure to track additions to the abstract routines. In other embodiments, the major version number may also be assigned automatically or an abstract routine may be dropped, which does not lead to backward incompatibility. These embodiments would include abstract routines in the data structure 430.

The information stored in data structure 430 constitutes one embodiment of a "core module signature," as used hereinafter, for the core software module.

The data structure of FIG. 4B can be used to describe a software interface with any programming language that has typed declarations for fields, such as constants and variables, and routines. Most programming languages do use typed declarations. A program written in one of these languages is parsed to find the declarations; the found declarations are parsed to find the names and types of the fields and routines; and, the names and types are accumulated in the data structure.

In one specific embodiment, the Java programming language is used. The use of Java simplifies the generation of the data structures 430 because the declarations for the fields and routines are stored with the binary class files. This embodiment uses a GNU Bytecode Java package to access the declarations in the binary class files. The GNU Bytecode Java package is available for use under a General Public License and is described in more detail in the document GNU Bytecode Java package, The Kawa Scheme Systems, Per Bother, found at the time of this writing in the default web page in the "kawa" subdirectory of the "software" directory of the "gnu.org" World Wide Web site.

FIG. 4C is a block diagram that illustrates another embodiment 470 of a data structure describing the interface of a core software module. In this embodiment, the unique signatures of the routines in the interface are not used directly in substructures 450 but are mapped through a hash function to unique codes stored in integers 460. The hash function provides a unique integer for each unique function signature.

As shown for hashed value 460a, the hashed value is based on the name and type of the routine and the number of parameters passed through the routine. If there are more than zero parameters for the routine, then the hashed value further depends on the name of the parameter and the type for the parameter. If more than one parameter exists, the hashed value depends on the remaining parameters as well, as illustrated in FIG. 4C by the name and type of the "second parameter" and by the ellipses 461.

A Tool for Assigning Version Numbers

Figure 5A:
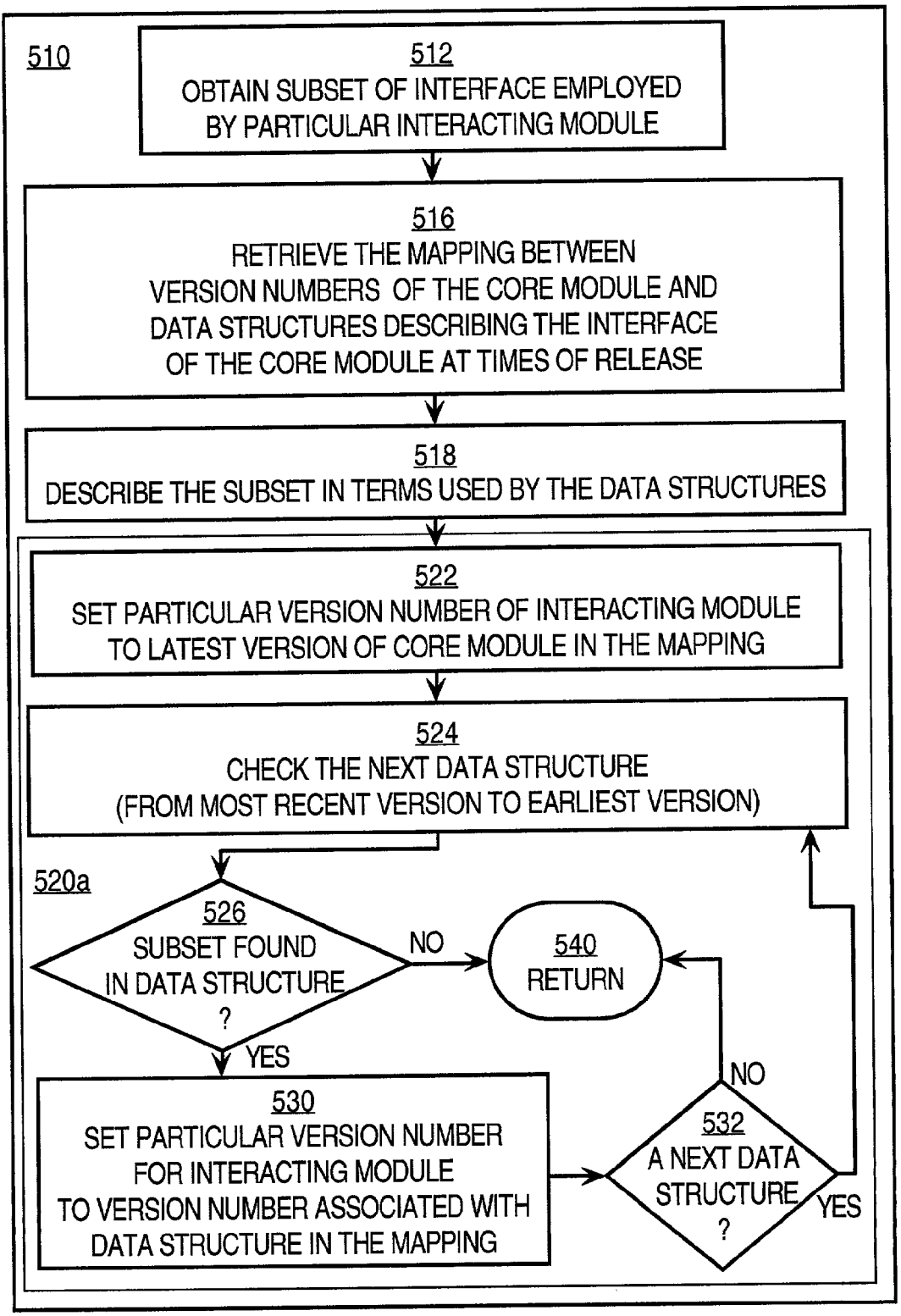
FIG. 5A is a flowchart that illustrates details for one embodiment of a method for a tool to automatically assign a version number for an interacting module.

FIG. 5A is a flowchart that illustrates details for embodiment 510 of a method for a tool to automatically assign a version number for an interacting module. In some embodiments using composite version numbers, this method is applied only to core module releases having the same major version number in order to assign a minor version number.

In step 512 the interface of the interacting module is obtained. In the case of software modules, the fields and routines employed by a particular interacting module being developed are obtained. The fields and routines constitute the reference signature of the interacting module. These fields and routines should constitute a subset of the complete set of fields and routines of the core module interface in the data structure, at least for the most recent release of the core module known to the developer of the interacting module. The interacting modules may employ either implemented routines or abstract routines or both. All the abstract routines of the interacting modules are implemented routines of a compatible core module. Symmetrically, all the abstract routines of the compatible core module are implemented routines of the interacting module.

For example, a particular interacting module 112a is developed in which feature 116 is an abstract routine of the interface and features 114a and 114b are implemented routines of the interface.

In step 516, the mapping received from the core module developer is retrieved. The mapping associates the version numbers of each release of the core module and the data structures describing the interface at the time of those releases, as described above. For example, a hypothetical mapping for core modules 132 and 102 in FIG. 1A is shown in Table 1.

TABLE 1

EXAMPLE MAPPING

| Data Structure | Core Module Version Number |
|---|---|
| Company A Network Management System 500, 0, 1, GetAddress, network address, 0 2 GetPorts, integer, 0 GetProperties, string array, 1, PortNo, integer | 2 |
| Company A Network Management System 500, 0, 2, GetAddress, network address, 0 WarnUser, void, 1, message, string 2 GetPorts, integer, 0 GetProperties, string array, 1, PortNo, integer | 32 |

In the example of Table 1, the data structure for core module 102 of FIG. 1A, having version number "2," includes a core module identification "Company A Network management System 500." The data structure also includes an integer "0" indicating no fields and an integer "1" indicating one implemented routine (corresponding to feature 106 in FIG. 1A). The implemented routine has a name "GetAddress" and returns a type called "network address" and takes zero parameters. The data structure next indicates there are 2 abstract routines called "GetPorts" and "GetProperties" (corresponding to features 104a and 104b, respectively, in FIG. 1A). GetPorts returns an integer and takes no parameters. GetProperties returns an array of strings and takes one parameter called "PortNo" of type integer. The functions performed by these routines and the meanings of the parameters would be described in documents provided to the interacting module developer by the developer of the core module. Such details are not relevant to understanding the present invention and are not generated or described for this hypothetical example.

In the example of Table 1, the data structure for core module 132 of FIG. 1A, having version number "32," includes the same substructures as in the data structure for core module version "2" and adds a second implemented function corresponding to feature 136 of FIG. 1A. Thus the integer on the third line of this data structure has a value "2" instead of "1." The second implemented function is named "WarnUser" and does not return a value, as indicated by type "void." The "WarnUser" function has one parameter called "message" of type "string."

In step 518, the interface of the interacting module is described using the same data structures used to define the interface of the core module. For a software interacting module, the fields employed by the interacting module are described by substructures 435 and the routines employed by the interacting modules are described by substructures 450 in some embodiments. In other embodiments integers containing hashed values are used in lieu of either substructures 435, 450 or both.

For example, the interface of interacting module 112 is described by the substructures shown in Table 2. According to Table 2, interacting module 112a implements the routines GetPorts and GetProperties (corresponding to features 114a and 114b, respectively, in FIG. 1A) and invokes the routine GetAddress in the core module (corresponding to feature 116 in FIG. 1A).

TABLE 2

Example Substructures describing interface for interacting module

| Line Number | Substructure Type | Substructure Contents |
|---|---|---|
| 1 | implemented routine | GetPorts, integer, 0 |
| 2 | implemented routine | GetProperties, string array, 1, PortNo, integer |
| 3 | abstract routine | GetAddress, network address, 0 |

According to one embodiment for software modules, a release of a core module is compatible with an interacting module if all the fields in substructures 435 and routines in substructures 450 referenced by the interacting module appear in the data structure 402 representing the core module interface. For example, interacting module 112a is compatible with both core module versions "2" and "32" because all three substructures in Table 2 appear in the data structures corresponding to both versions of the core module in Table 1. Also, abstract routines in the core module are complimentary implemented routines in the interacting module 112a, while implemented routines in the core module are complementary abstract routines in the interacting module 112a.

In step 520a (and step 520b described below with respect to FIG. 5B), the earliest core module compatible with the particular interacting module is found, and the corresponding version number is assigned as the version number of the interacting module. For example, version "2" is assigned to the interacting module 112a.

According to the illustrated embodiment, step 520a includes steps 522, 524, 526, 530, 532 and 540. In step 522 the version number for the particular interacting module is temporarily set to the latest version number in the mapping. In step 524 a control flow loop is executed through the data structures from the one associated with the latest version to the one associated with the earliest version of the core module, by making the data structure of the next earlier version the current data structure.

In step 526, it is determined whether the subset comprising all the fields and routines referenced by the interacting module are found in the current data structure. If the subset is found in the current data structure, then control passes to step 530 to set the particular version of the particular interacting module to the version number associated in the mapping with the current data structure. This indicates that the current data structure is the earliest so far found that contains the entire subset. Control then passes to step 532 to determine if there is another data structure in the mapping. If not, then processing is finished and control passes to step 540 to return to any calling program or routine. If there is another data structure in the mapping, then control passes back to step 524 to make the next data structure the current data structure and check it for compatibility.

If, in step 526, the subset is not found in the current data structure, then the associated version of the core module is not compatible with the particular interacting module. In this case, the next later version in time, already assigned as the version for the particular interacting module in step 522 or step 530, is the earliest that is compatible with the interacting module, and the method is complete. Control passes to step 540 to return to the calling program.

Figure 5B:
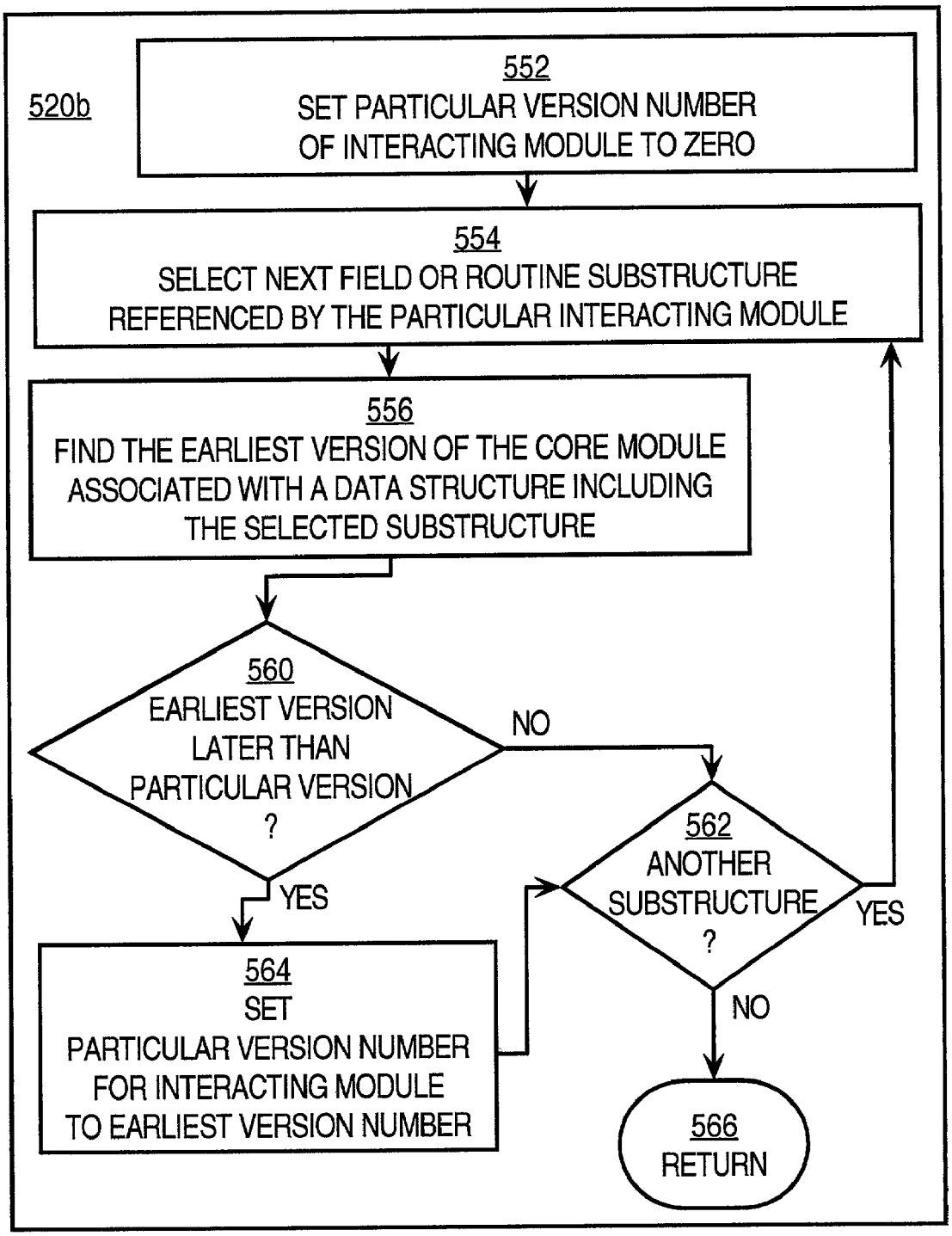
FIG. 5B is a flowchart that illustrates details for another embodiment of a method for a tool to automatically assign a version number for an interacting module.

In an alternative embodiment, 520b, shown in FIG. 5B, the signature of each referenced field and routine is separately found in a data structure associated with the earliest version of the core module. A different earliest version may be found for each field or routine. The earliest released version of the core module that supports all of the referenced fields and routines is the latest version of these different earliest versions.

In step 552, the particular version number for the particular interacting module is temporarily set to zero. In step 554, the next field or routine substructure is selected, as part of a control flow loop over all the substructures referenced by the particular interacting module.

In step 556, the earliest version number of the core module associated with a data structure including the selected substructure is found. In one embodiment, step 556 includes steps like steps 522, 524, 526, 530, 532 and 540 of FIG. 5A but returning control to step 556 and applying to the selected substructure alone, rather than being applied to the entire subset of fields and routines referenced by the particular interacting module as shown in FIG. 5A.

In step 560 the earliest version number found in step 556 is compared to the particular version number already assigned. If the earliest version number just found in step 556 is later than the particular version number already assigned, as occurs for the first selected substructure for which the particular version number is zero, then control passes to step 564 to assign a new number to the particular version number.

In step 564, the particular version number for the particular interacting module is assigned a value equal to the earliest version number found in step 556.

If it is determined in step 560 that the earliest version found in step 556 is not later than the particular version number, then control passes to step 562 to determine if there are any more field or routine substructures referenced by the particular interacting module. If there is another substructure, then control passes to step 554 to select the next substructure and repeat steps 556, 560, 564 and 562. If there are no more substructures referenced by the interacting module, then the method is complete and control passes to step 566 to return control to the calling program.

In steps 520a and 520b, the testing involved to find the data structure associated with the earliest release that includes all the function signatures of the interacting module can consume noticeable computational resources. For example, some core module signatures involve data structures that are millions of 8-bit bytes in size, and can take about a minute of observable time to yield a version number. However, this consumption is reasonable and tolerable because it is performed as part of a development effort for an interacting module that can consume hundreds of programmer hours. It is expected that hashed routine signatures can be tested faster than substructures, such as 450, that explicitly recite all names and types. Therefore a core module signature comprising hashed routine signatures also presents a reasonable and tolerable consumption of resources during development of interacting modules. The time-consuming generation of a particular version number for a particular interacting module is essentially performed only once for each interacting module developed. After the version number is generated, the process to determine compatibility at install time or run time, such as in methods illustrated in FIG. 2A and FIG. 2B, is very small and is completed in fractions of second.

The automated step 520, such as embodiments 520a and 520b, discover compatibility for a particular interacting module with the earliest core module, even if the compatible core module has a release date that substantially predates the date when the interacting module is developed.

Hardware Overview

Figure 6:
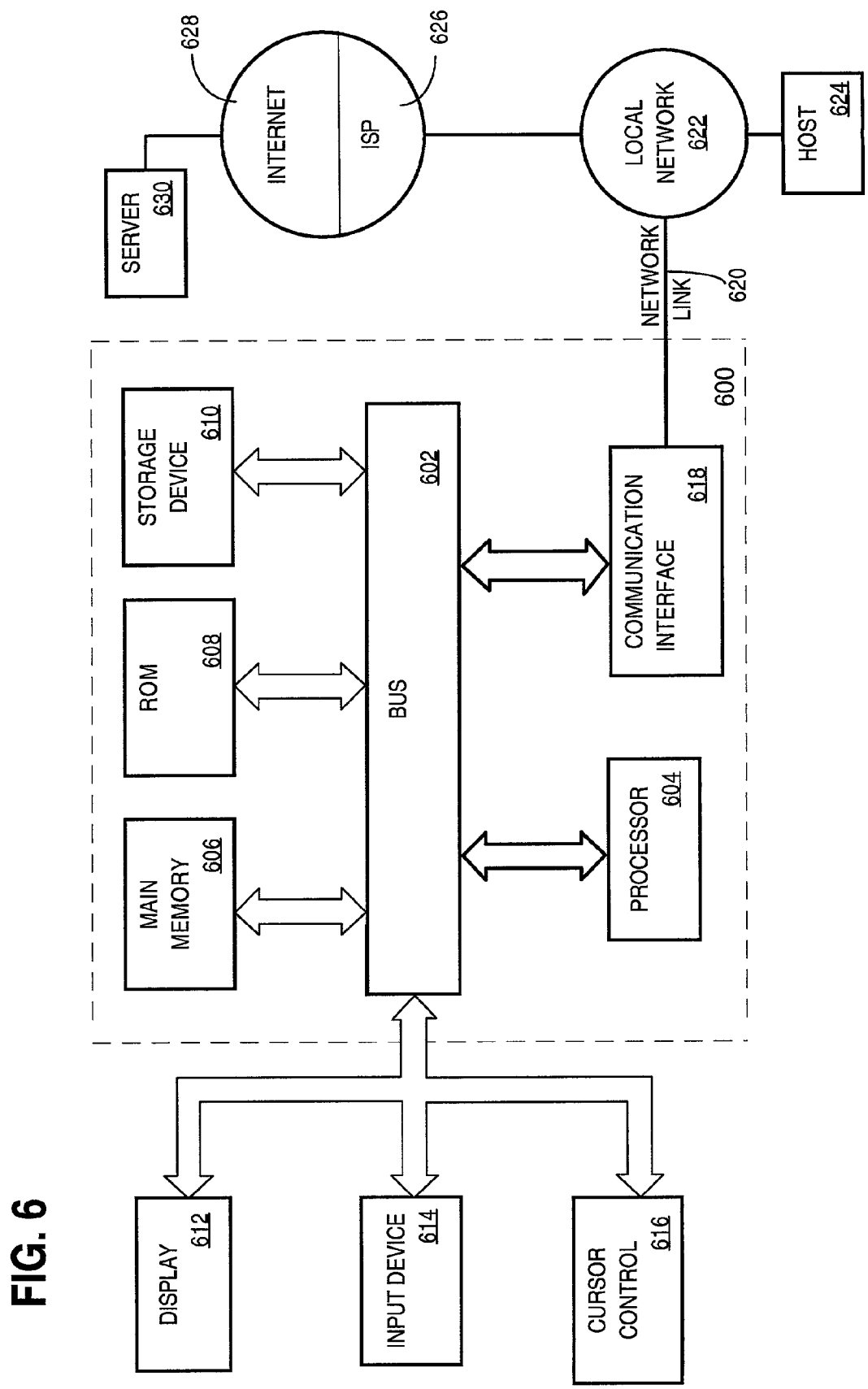
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for maintaining compatibility between a core module and an interacting module. According to one embodiment of the invention, a version number for an interacting module is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for a tool to automatically assign a version number to an interacting module as described herein.

The received code may be executed by processor 604 as it is received, and/or stored in storage device 610, or other non-volatile storage for later execution. In this manner, computer system 600 may obtain application code in the form of a carrier wave.

Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of maintaining version compatibility between a first computer program module and one or more interacting computer program modules that interact with the first module through a interface with capabilities shared by all the interacting modules, wherein the modules are stored in computer storage, the method comprising the computer-implemented steps of:
   creating first information describing the computer program module interface capabilities at one or more times;
   storing the first information in a corresponding plurality of instances of a data structure wherein each instance of the data structure corresponds to the interface capabilities at one or more plurality of times;
   creating and storing a mapping that associates the plurality of instances with a corresponding plurality of version numbers for the first computer program module;
   automatically assigning a second version number for a second computer program module of the one or more interacting modules based on a corresponding instance from the plurality of instances of the data structure contained in the mapping and based on second information describing interface capabilities of the second computer program module;
   determining compatibility of the modules based on a first version number for the first module and the second version number for the second module;
   wherein the step of automatically assigning comprises:
   describing a subset of the interface capabilities, which subset is employed by the second computer program module;
   determining from the plurality of instances at least one instance including data describing the subset of the interface capabilities; and
   assigning the second version number for the second module based on the corresponding version number in the mapping and the at least one instance.

2. A method as recited in claim 1, wherein said step of assigning the second version number comprises assigning as the second version number a particular value of the plurality of version numbers for the first module, the particular value associated with a particular instance of the at least one instance, the particular instance corresponding to an earliest time of one or more times corresponding to the at least one instance.

3. A method as recited in claim 1, wherein the plurality of version numbers for the first computer program module corresponding to the plurality of instances vary in one direction with time of the plurality of times corresponding to the plurality of instances.

4. A method as recited in claim 1, wherein said step of describing the computer program module interface capabilities includes generating and storing in a first instance of the data structure data indicating signatures of a plurality of routines of the interface at a first time, wherein a signature of each routine includes a name of the routine and a type of the routine and parameter types for all parameters of the routine.

5. A method as recited in claim 1, wherein:
   each of the interacting computer program modules include instructions causing one or more processors to obtain at least one of a property of a corresponding networking device type of a plurality of networking devices types and an action performed by the corresponding networking device type;
   the first computer program module includes instructions causing one or more processors, based on interacting with a particular interacting computer program module, to perform at least one of communicating with a first device of the corresponding networking device type on a network of networking devices including the first device, and presenting properties of the first device to a network manager for the network, and displaying connections among the networking devices of the network to the network manager; and
   the plurality of networking devices types include one or more models of repeater, a switch, a router, a hub, a bridge, and a gateway.

6. A method as recited in claim 1, wherein the second version number is assigned when the second module is developed; and compatibility is determined at a later time.

7. A computer-implemented method of maintaining version compatibility between a first module and one or more interacting modules that interact with the first module through an interface, the method comprising the steps of:
   retrieving data from a stored mapping between a plurality of instances of a data structure describing capabilities of the interface at a corresponding plurality of times and a corresponding plurality of version numbers for the first module;
   automatically assigning a second version number for a second module of the one or more interacting modules based on the mapping and based on a description of interface capabilities of the second module;
   determining compatibility based on a first version number for the first module and the second version number for the second module;
   wherein the step of automatically assigning comprises:
   describing a subset of the interface capabilities which subset is employed by the second module;
   determining from the plurality of instances at least one instance including data describing the subset of the interface capabilities; and
   assigning the second version number for the second module based on the corresponding version number in the mapping and the at least one instance.

8. A method as recited in claim 7, wherein said step of assigning the second version number comprises assigning as the second version number a particular value of the plurality of version numbers for the first computer program module, the particular value associated with a particular instance of the at least one instance, the particular instance corresponding to an earliest time of one or more times corresponding to the at least one instance.

9. A method as recited in claim 7, wherein the plurality of version numbers for the first computer program module corresponding to the plurality of instances vary in one direction with time of the plurality of times corresponding to the plurality of instances.

10. A method as recited in claim 7, wherein a first instance of the data structure comprises data indicating a routine name and a routine type of a routine of the first module at a first time.

11. A method as recited in claim 10, wherein the first data further indicates a parameter type for the routine.

12. A method as recited in claim 7, wherein a first instance of the data structure comprises data indicating signatures of a plurality of routines of the computer program module interface capabilities at a first time, wherein a signature of each routine includes a name of the routine and a type of the routine and parameter types for all parameters of the routine.

13. A method as recited in claim 12, wherein the data indicating signatures of the plurality of routines of the computer program interface capabilities at a first time comprises hashed values, each hashed value uniquely indicating a signature of each routine of the interface.

14. A method as recited in claim 12, wherein the plurality of routines comprises all the routines of the interface.

15. A method as recited in claim 12, wherein the plurality of routines comprises all the routines of the interface except routines not implemented in the first module.

16. A method as recited in claim 7, wherein:
the second version number is developed when the second computer program module is developed; and
compatibility is determined at a later time.

17. A method as recited in claim 16, wherein compatibility is determined when the second computer program module is installed for use with the first computer program module.

18. A method as recited in claim 16, wherein compatibility is determined when the second computer program module is invoked for execution by the first module.

19. A method as recited in claim 7, wherein each computer program module of the first computer program module and the one or more interacting computer program modules comprises instructions for causing one or more processors to perform one or more tasks.

20. A method as recited in claim 19, wherein:
each of the interacting computer program modules include instructions causing one or more processors to obtain at least one of a property of a corresponding networking device type of a plurality of networking devices types and an action performed by the corresponding networking device type;
the first module includes instructions causing one or more processors, based on interacting with a particular interacting computer program module, to perform at least one of communicating with a first device of the corresponding networking device type on a network of networking devices including the first device, and presenting properties of the first device to a network manager for the network, and displaying connections among the networking devices of the network to the network manager; and
the plurality of networking devices types include one or more models of repeater, a switch, a router, a hub, a bridge, and a gateway.

21. A method as recited in claim 7, wherein the first computer program module comprises instructions for causing one or more processors to manage a plurality of networking devices in response to data indicating input by a user.

22. A method as recited in claim 7, wherein each interacting computer program module of the one or more interacting computer program modules comprises instructions for causing one or more processors to provide device-specific information for one of a plurality of networking devices.

23. A computer-implemented method of determining version compatibility between a first computer program module and a computer program second module of one or more interacting modules that interact with the first computer program module through an interface, the method comprising the steps of:
obtaining a first version number for the first computer program module;
automatically assigning a second version number for the second computer program module, the second version number set when the second computer program module is developed based on a mapping between a plurality of instances of a data structure describing the interface capabilities at a corresponding plurality of times and a corresponding plurality of version numbers for the first computer program module and based on a description of interface capabilities of the second computer program module; and
determining whether the computer program modules are compatible based on the first version number and the second version numbers;
wherein the step of automatically assigning comprises:
describing a subset of the interface capabilities, which subset is employed by the second computer program module;
determining from the plurality of instances at least one instance including data describing the subset of the interface capabilities; and
assigning the second version number for the second module based on the corresponding version number in the mapping and the at least one instance.

24. A method as recited in claim 23, wherein:
each of the interacting computer program modules include instructions causing one or more processors to obtain at least one of a property of a corresponding networking device type of a plurality of networking devices types and an action performed by the corresponding networking device type;
the first computer program module includes instructions causing one or more processors, based on interacting with a particular interacting computer program module, to perform at least one of communicating with a first device of the corresponding networking device type on a network of networking devices including the first device, and presenting properties of the first device to a network manager for the network, and displaying connections among the networking devices of the network to the network manager; and
the plurality of networking devices types include one or more models of repeater, a switch, a router, a hub, a bridge, and a gateway.

25. A computer-readable storage medium for maintaining version compatibility between a first computer program module and one or more interacting computer program modules that interact with the first computer program module through an interface, the computer-readable storage medium carrying:
a plurality of instances of a data structure describing the interface capabilities at a corresponding plurality of times;
a mapping that associates the plurality of instances with a corresponding plurality of version numbers for the first computer program module; and one or more sequences of instructions, which, when executed by one or more processors, cause the one or more processors to carry out the steps of retrieving data from the mapping, and automatically assigning a second version number for a second computer program module of the one or more interacting computer program modules based on the mapping and based on a description of interface capabilities of the second module, wherein compatibility is determined based on a first version number for the first computer program module and the second version number for the second computer program module;

wherein the step of automatically assigning comprises:

describing a subset of the interface capabilities, which subset is employed by the second computer program module;

determining from the plurality of instances at least one instance including data describing the subset of the interface capabilities; and assigning the second version number for the second module based on the corresponding version number in the mapping and the at least one instance.

26. A system for maintaining version compatibility between a first computer program module and one or more interacting computer program modules that interact with the first computer program module through an interface, the system comprising:

means for retrieving a stored mapping between a plurality of instances of a data structure describing the interface capabilities at a corresponding plurality of times and a corresponding plurality of version numbers for the first computer program module;

means for automatically assigning a second version number for a second computer program module of the one or more interacting computer program modules based on the mapping and based on a description of interface capabilities of the second module;

means for determining compatibility based on a first version number for the first computer program module and the second version number for the computer program second module;

wherein the automatically assigning means comprises:

means for describing a subset of the interface capabilities which subset is employed by the second computer program module;

means for determining from the plurality of instances at least one instance including data describing the subset of the interface capabilities; and means for assigning the second version number for the second module based on the corresponding version number in the mapping and the at least one instance.

27. A computer system for maintaining version compatibility between a first computer program module and one or more interacting computer program modules that interact with the first computer program module through an interface, the system comprising:

a processor;

a computer-readable storage medium carrying a stored mapping between a plurality of instances of a data structure describing the interface capabilities at a corresponding plurality of times and a corresponding plurality of version numbers for the first computer program module, and one or more stored sequences of instructions which, when executed by the processor, cause the processor to carry out the steps of:

retrieving data from the mapping;

automatically assigning a second version number for a second computer program module of the one or more interacting computer program modules based on the mapping and based on a description of interface capabilities of the second module;

determining compatibility based on a first version number for the first computer program module and the second version number for the second computer program module;

wherein the step of automatically assigning comprises:

describing a subset of the interface capabilities which subset is employed by the second computer program module;

determining from the plurality of instances at least one instance including data describing the subset of the interface capabilities; and assigning the second version number for the second module based on the corresponding version number in the mapping and the at least one instance.

* * * * *

UNITED STATES PATENT AND TRADEMARK OFFICE
CERTIFICATE OF CORRECTION

PATENT NO.         : 6,971,093 B1
APPLICATION NO. : 09/855386
DATED              : November 29, 2005
INVENTOR(S)       : Maximilian J. Spring Page 1 of 1

It is certified that error appears in the above-identified patent and that said Letters Patent is hereby corrected as shown below:

Column 20
Claim 7: Line 46, delete "capabilities which" and insert -- capabilities, which --.

Column 22
Claim 23: Line 24, delete "numbers" and insert --number--.

Column 23
Claim 26: Lines 44-45, delete "capabilities which" and insert -- capabilities, which --.

Column 24
Claim 27: Line 36, delete "capabilities which" and insert -- capabilities, which --.

Signed and Sealed this

Twelfth Day of December, 2006

JON W. DUDAS
*Director of the United States Patent and Trademark Office*